(12) United States Patent
Oehring et al.

(10) Patent No.: US 12,027,831 B2
(45) Date of Patent: *Jul. 2, 2024

(54) SWITCHGEAR LOAD SHARING FOR OIL FIELD EQUIPMENT

(71) Applicant: U.S. Well Services, LLC, Houston, TX (US)

(72) Inventors: Jared Oehring, Houston, TX (US); Brandon N. Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,844

(22) Filed: Sep. 20, 2022

(65) Prior Publication Data

US 2023/0155358 A1 May 18, 2023

Related U.S. Application Data

(63) Continuation of application No. 16/901,774, filed on Jun. 15, 2020, now Pat. No. 11,451,016, which is a
(Continued)

(51) Int. Cl.
| | |
|---|---|
| *E21B 43/26* | (2006.01) |
| *E21B 41/00* | (2006.01) |
| *F02C 3/22* | (2006.01) |
| *F04B 17/03* | (2006.01) |
| *F04B 23/04* | (2006.01) |
| *F04B 35/04* | (2006.01) |

(Continued)

(52) U.S. Cl.
CPC .............. *H02B 7/06* (2013.01); *E21B 41/00* (2013.01); *E21B 43/26* (2013.01); *F02C 3/22* (2013.01); *F04B 17/03* (2013.01); *F04B 23/04* (2013.01); *F04B 35/04* (2013.01); *F04B 47/02* (2013.01); *F04B 49/20* (2013.01)

(58) Field of Classification Search
CPC ........... H02J 11/00; H02J 13/00; H02B 11/00; H02B 13/00
See application file for complete search history.

(56) References Cited

U.S. PATENT DOCUMENTS

| | | | |
|---|---|---|---|
| 7,977,824 B2 * | 7/2011 | Halen .................... | H01H 9/541 307/130 |
| 9,450,385 B2 * | 9/2016 | Kristensen ........... | H02B 13/045 |

(Continued)

*Primary Examiner* — Kenneth L Thompson
(74) *Attorney, Agent, or Firm* — Hogan Lovells US LLP

(57) ABSTRACT

A hydraulic fracturing system for fracturing a subterranean formation is disclosed. In an embodiment, the system may include a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation; at least one generator electrically coupled to the plurality of electric pumps so as to generate electricity for use by the plurality of electric pumps; and at least one switchgear electrically coupled to the at least one generator and configured to distribute an electrical load between the plurality of electric pumps and the at least one generator.

20 Claims, 13 Drawing Sheets

Related U.S. Application Data continuation of application No. 15/893,766, filed on Feb. 12, 2018, now Pat. No. 10,686,301, which is a continuation of application No. 15/487,694, filed on Apr. 14, 2017, now Pat. No. 9,893,500.

(60) Provisional application No. 62/323,168, filed on Apr. 15, 2016.

(51) Int. Cl.
*F04B 47/02* (2006.01)
*F04B 49/20* (2006.01)
*H02B 7/06* (2006.01)

(56) References Cited

U.S. PATENT DOCUMENTS

| | | | |
|---|---|---|---|
| 9,627,862 B2* | 4/2017 | Hytten | E21B 43/017 |
| 9,893,500 B2* | 2/2018 | Oehring | F04B 35/04 |
| 10,246,984 B2* | 4/2019 | Payne | E21B 44/00 |
| 10,686,301 B2* | 6/2020 | Oehring | F04B 35/04 |
| 10,753,165 B1* | 8/2020 | Fischer | F04B 17/06 |
| 11,451,016 B2* | 9/2022 | Oehring | F02C 3/22 |
| 11,578,577 B2* | 2/2023 | Hinderliter | H02B 1/24 |
| 2005/0116541 A1* | 6/2005 | Seiver | H02J 3/06 |
| | | | 307/16 |
| 2022/0029391 A1* | 1/2022 | Ough | H02B 1/20 |

* cited by examiner

SWITCHGEAR LOAD SHARING FOR OIL FIELD EQUIPMENT

CROSS REFERENCE TO RELATED APPLICATIONS

This application is a continuation of U.S. application Ser. No. 16/901,774, filed Jun. 15, 2020, now U.S. Pat. No. 11,451,016 issued Sep. 20, 2022, which is a continuation of U.S. application Ser. No. 15/893,766, filed Feb. 12, 2018, now U.S. Pat. No. 10,686,301 issued Jun. 16, 2020, which is a continuation of U.S. application Ser. No. 15/487,694, filed Apr. 14, 2017, now U.S. Pat. No. 9,893,500 issued Feb. 13, 2018, and claims priority to and the benefit of U.S. Provisional Application Ser. No. 62/323,168, filed Apr. 15, 2016, the full disclosures of which are hereby incorporated herein by reference.

BACKGROUND

1. Technical Field

This disclosure relates generally to hydraulic fracturing and more particularly to systems and methods for spare turbine power generation, which is sometimes referred to as reserve power.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems the fracturing equipment runs on diesel-generated mechanical power or by other internal combustion engines. Such engines may be very powerful, but have certain disadvantages. Diesel is more expensive, is less environmentally friendly, less safe, and heavier to transport than natural gas. For example, heavy diesel engines may require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations requires constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. As is well known, turbines generally operate more efficiently at higher loads. Many power plants or industrial plants steadily operate turbines at 98% to 99% of their maximum potential to achieve the greatest efficiency and maintain this level of use without significant difficulty. This is due in part to these plants having a steady power demand that either does not fluctuate (i.e., constant power demand), or having sufficient warning if a load will change (e.g., when shutting down or starting up a factory process).

In hydraulic fracturing, by contrast, the electrical load constantly changes and can be unpredictable. This unpredictability is due to the process of pumping fluid down a wellbore, which can cause wellhead pressure to spike several thousand PSI without warning, or can cause pressure to drop several PSI unexpectedly (sometimes called a "break," as in the formation broke open somewhere). In order to maintain a consistent pump rate, the pump motors are required to "throttle" up or "throttle" down (applying more or less torque from a variable frequency drive), drawing either more or less electrical power from the turbines with little to no notice in many situations.

Concurrently with pressure variations, fluid rate variations can also occur. At any moment, the contracting customer may ask for an extra 5 barrels per minute (bpm) of pump rate or may request an instantly decreased pump rate with little to no warning. These power demand changes can vary from second to second—unlike industrial power demands, which may vary from hour to hour or day to day, allowing for planning and coordination.

Hydraulic horsepower (HHP) can be calculated with the following relationship:

$$HHP = \frac{(\text{Wellhead Pressure}) \times (\text{Pump Rate})}{40.8}$$

HHP also directly correlates with the power demand from the turbines, where:

$$HHP \approx \text{Electrical Power Demand}$$

Therefore, if both variables (rate and pressure) are constantly changing, maintaining a steady power demand can be difficult. Due to this, it is impossible to design the equipment and hold the turbine output at 98%-99% of full potential because a minute increase in power demand may shut the turbines down and may result in failure of the fracturing job. To prevent such turbine shutdown from happening, fracturing equipment is designed to only require approximately 70% of the maximum output of the turbine generators during normal and expected operating conditions. This allows the fleet to be able to operate against changing fracturing conditions, including increased fluid rate and increased wellhead pressure.

There are also other small loads which contribute to changing power demand. These include turning on or off small electrical motors for hydraulic pumps, chemical pumps, cooling fans, valve actuators, small fluid pumps, etc., or power for metering instrumentation, communication equipment, and other small electronics. Even lighting or heating can contribute to the fluctuating power load.

Therefore it may be desirable to devise a means by which turbine power generation can be managed at an output usable by fracturing equipment.

SUMMARY

The present disclosure is directed to a method and system for providing electrical load sharing between switchgear trailers acting as power hubs to combine the output of multiple electrical generators.

In accordance with an aspect of the disclosed subject matter, the method and system of the present disclosure provide a hydraulic fracturing system for fracturing a subterranean formation. In an embodiment, the system can include a plurality of electric pumps fluidly connected to the formation and configured to pump fluid into a wellbore at high pressure so that the fluid passes from the wellbore into the formation and fractures the formation; at least one generator electrically coupled to the plurality of electric pumps so as to generate electricity for use by the plurality of electric pumps; and at least one switchgear electrically coupled to the at least one generator and configured to distribute an electrical load between the plurality of electric pumps and the at least one generator.

In an embodiment, the system including the plurality of electric pumps, the at least one generator, and the at least one switchgear can be a single electrical microgrid.

In an embodiment, the system making up the single electrical microgrid can be split into two or more electrical banks. In an embodiment, each of the two or more electrical banks can include at least one generator and at least one switchgear. In an embodiment, when one or more of the two or more electrical banks is shut down, each of the other active electrical banks can be configured to distribute the electrical load between the plurality of electric pumps and the at least one generator associated with each active electrical bank.

In an embodiment, the system can further include at least two switchgear units electrically coupled to the at least one generator, and a tie breaker electrically coupled between each of the at least two switchgear units.

In an embodiment, the tie breaker can be configured to evenly distribute the electrical load between the plurality of electric pumps and the at least one generator when the tie breaker is in a closed position; and isolate one or more of the plurality of electric pumps, the at least one generator, and the at least two switchgear units when the tie breaker is in an open position.

In an embodiment, when the tie breaker is in the closed position, at least one generator is shut down and at least one other generator is active, the electrical load can be evenly distributed among the at least one other active generators.

In an embodiment, the tie breaker can include a long distance transmission line.

In an embodiment, the at least one switchgear can be configured to distribute power among any of one or more transformers, auxiliaries, or other switchgear units, or a combination thereof.

In an embodiment, the one or more auxiliaries can include any of a blender, electric wireline equipment, a water transfer pump, an electric crane, a data van, a work trailer, living quarters, an emergency shower, sand equipment, a turbine inlet chiller, a compressor station, a pumping station, a second fracturing site, a drill rig, or a nitrogen plant, or a combination thereof.

In an embodiment, the at least one generator can be one of a turbine generator or a diesel generator, or a combination thereof.

In an embodiment, the at least one turbine generator can be powered by natural gas.

In an embodiment, wherein each component of the system can be modular and movable to different locations on mobile platforms.

In an embodiment, the system can further include a power connection panel associated with the plurality of electric pumps. In an embodiment, the power connection panel can include a plurality of power connections for each of the plurality of electric pumps, and a system ground connection configured to act as a ground between the plurality of electric pumps and a transformer. In an embodiment, the transformer can be configured to provide power to the plurality of electric pumps.

In an embodiment, the system can further include a variable frequency drive connected to the at least one electric motor to control the speed of the at least one electric motor. In an embodiment, the variable frequency drive can frequently perform electric motor diagnostics to prevent damage to the at least one electric motor.

In accordance with another aspect of the disclosed subject matter, the method and system of the present disclosure provide a hydraulic fracturing system for fracturing a subterranean formation. In an embodiment, the system can include a plurality of electric pumps fluidly connected to the formation and configured to pump fluid into a wellbore at high pressure so that the fluid passes from the wellbore into the formation and fractures the formation; at least one turbine generator electrically coupled to the plurality of electric pumps so as to generate electricity for use by the plurality of electric pumps; at least two switchgear units electrically coupled to the at least one turbine generator and configured to distribute an electrical load between the plurality of electric pumps and the at least one turbine generator; a tie breaker electrically coupled between each of the at least two switchgear units and configured to evenly distribute the electrical load between the plurality of electric pumps and the at least one turbine generator when the tie breaker is in a closed position; and a variable frequency drive connected to the at least one electric motor to control the speed of the at least one electric motor, wherein the variable frequency drive frequently performs electric motor diagnostics to prevent damage to the at least one electric motor.

Other aspects and features of the present disclosure will become apparent to those of ordinary skill in the art after reading the detailed description herein and the accompanying figures.

BRIEF DESCRIPTION OF DRAWINGS

Some of the features and benefits of the present disclosure having been stated, others will become apparent as the description proceeds when taken in conjunction with the accompanying drawings, in which.

Figure 1:
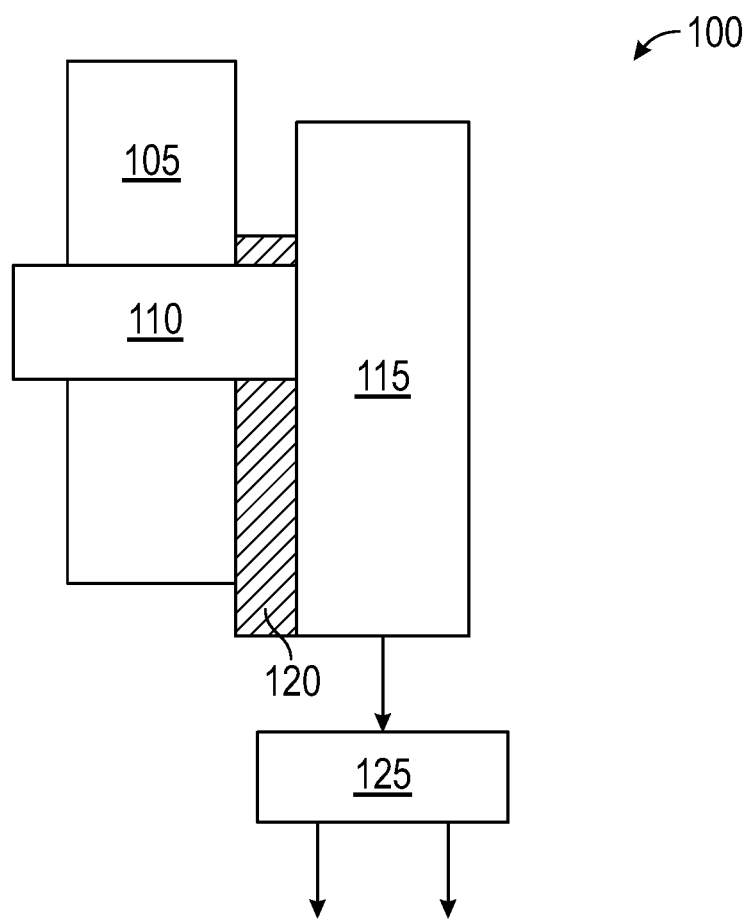
FIG. 1 is a schematic example of a turbine generator in communication with an electronic equipment room, which connects to a switchgear according to an embodiment of the disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein is an example of a method and system for providing electrical load sharing between switchgear trailers acting as power hubs to combine the output of multiple electrical generators. Adding a tie breaker between two switchgear trailers can eliminate the need for a third switchgear trailer, while still retaining the ability to evenly distribute power between all of the equipment, and to concurrently evenly distribute the electrical load between a plurality of turbine generator sets.

A feature of the switchgear configurations described herein is the capability to selectively choose between either load sharing, to provide efficiency and flexibility; or having isolated banks of equipment, to provide protection and redundancy. In an embodiment, the switchgear optionally includes a tie breaker. The tie breaker can synchronize three-phase power of a similar voltage and frequency from different sources to act as a common bus, and can evenly distribute the electrical load between a plurality of electric pumps and turbine generators when the tie breaker is in a closed position. The tie breaker will isolate one or more of the plurality of electric pumps, the turbine generator, and the switchgear units when the tie breaker is in an open position. The use of a tie breaker can provide an advantage over previous load sharing systems because use of a tie breaker provides more options for the equipment operators and allows the fleet to be more versatile as to which mode of operation—protection and redundancy, or efficiency and flexibility—is more desirable at any given moment.

Another favorable aspect of load sharing is the ability to shutdown turbines when peak power output is not required. If the power load is distributed evenly between all of the generator sets in the fleet, then it can be possible to shut down unnecessary power generation as long as the remaining generator sets can compensate for the loss and pick up the extra load placed on them. This flexibility for partial shutdown can allow the remaining turbines to operate at a higher efficiency, which can reduce wear on the fleet by not running every turbine continuously, and increase efficiency while reducing emissions by allowing fewer turbines to run in a lower emissions mode. The lower emissions mode is called SoloNox, and can be performed due to load sharing using a switchgear, because the turbines can only operate in this mode while operating above a 50% load. In some embodiments, directly powering fracturing pumps can involve using all turbines regardless of the required power load.

In an embodiment, a variable frequency drive (VFD)—and in some cases, an A/C console used to keep the VFD from overheating—can be utilized to control the speed of an electric motor associated with a pump powered by the turbine(s).

In some examples, certain tasks can be accomplished with fewer turbines. Instead of having redundancy or spare power generation available to isolated power banks, the reserve power generation capability can be consolidated across the entire fleet. Requiring fewer turbine generators means the equipment can now fit on smaller well sites which reduces the need to clear more land and disrupt the surrounding environment to create a larger pad, and reduces the costs associated with such clearing and construction.

The systems described herein are not limited to use in processes involving hydraulic fracturing. For example, the system includes electric fracturing equipment and power generation equipment. The power generation equipment can be used to supply any oilfield equipment including compressor stations, pumping stations, nitrogen plants, $CO_2$ plants, drilling rigs, work-over rigs, barracks, coiled tubing units, refineries, or other systems or applications that do not have access to a utility provided power grid or that have a dynamic power load or low power factor.

FIG. 1 is a block diagram showing the basic components of a hydraulic fracturing well site power generation system 100 for providing electrical load sharing according to an embodiment. A turbine generator 105 can include a natural gas turbine engine coupled to a three-phase, 60 hertz (Hz) electric generator to produce power as the turbine engine rotates. In an alternative, the generator can generate electricity at 50 Hz, or at any other power level useful for hydraulic fracturing fleets. In the illustrated embodiment, the turbine generator 105 is shown being electrically connected to an electronic equipment room (EER) 115, which can house wiring, breakers, controls, monitoring systems, fire suppression support, and a battery bank for secondary power when the turbine is not operating and there is no other power source. In some examples, the battery bank can power lighting, fire suppression, emergency turbine lube pumps, and onboard electronics. The combination of a turbine generator 105 and an EER 115 can be referred to as a generator set. A switchgear trailer 125 can provide power distribution, high voltage breakers, and "lock-out, tag-out" (a safety procedure used to ensure that dangerous machines are properly shut off and not able to be started up again prior to the completion of maintenance or servicing work) capabilities.

Transformers can optionally be included with the equipment of FIG. 1. As illustrated in the embodiment shown in FIG. 1, an air intake filter house 110 can be positioned on top of or adjacent to the turbine generator 105, and a catwalk 120 can connect turbine generator 105 and EER 115 for ease of access. The system 100 as a whole can define an example of an electrical microgrid.

Figure 2:
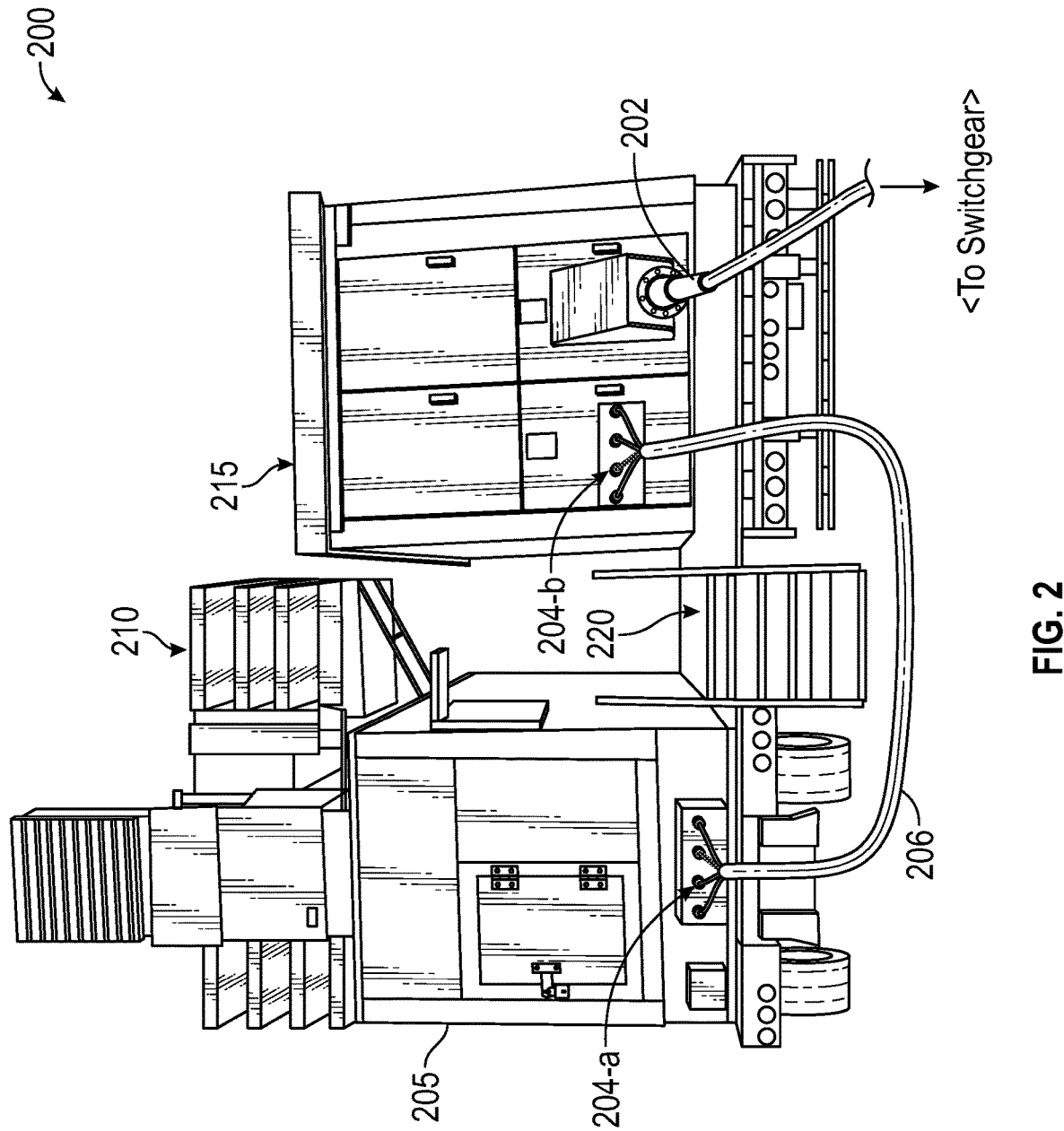
FIG. 2 is a perspective view of an example of a turbine generator and electronic equipment room according to an embodiment of the disclosure.

FIG. 2 shows a perspective view of an example system 200 having a single generator set with a turbine generator 205 and an overhanging filter house 210 according to an embodiment. A power cable 206 can connect the turbine generator 205 to an EER 215 with plugs 204-a, 204-b. In some embodiments, plugs 204-a, 204-b are enclosed and concealed while energized. Between turbine 205 and EER 215 is an elevated catwalk 220 with stairs leading to the EER 215 for employee access, in the illustrated embodiment. Turbine 205 can also include maintenance hatches for purposes of employee access. A plug 202 can provide a power cable between the EER 215 and a switchgear trailer (not shown).

Figure 3A:
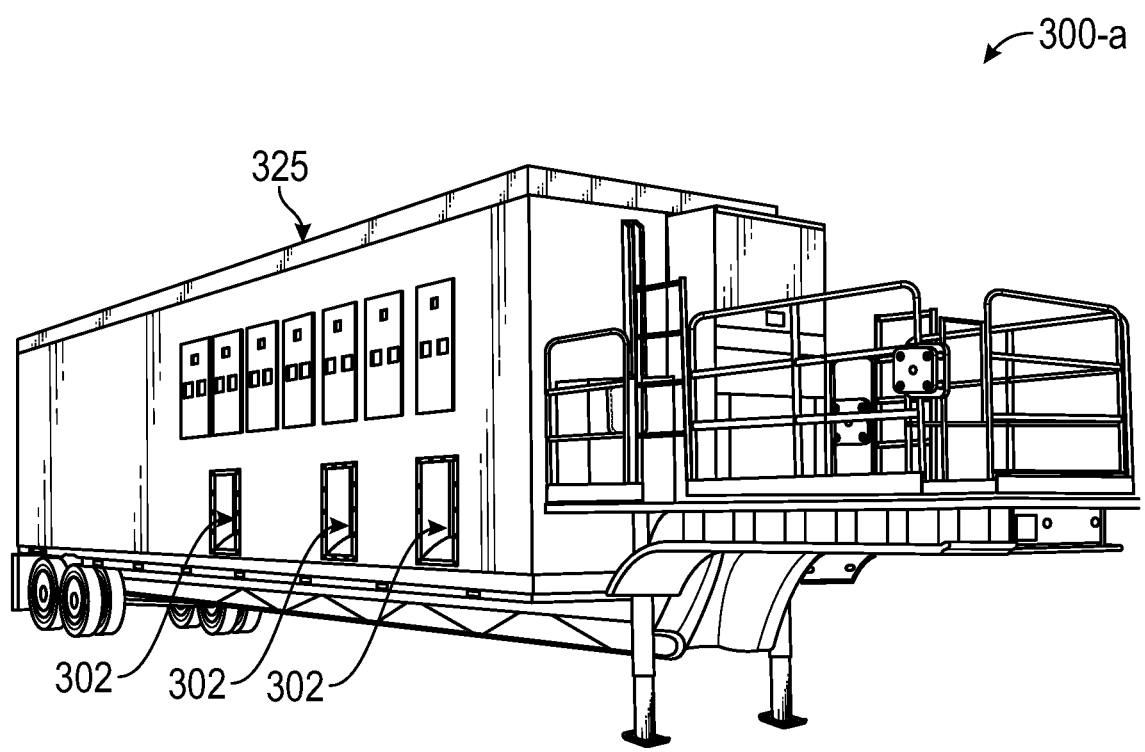
FIGS. 3A and 3B are perspective views of a switchgear trailer according to an embodiment of the disclosure.

An example 300-a of a switchgear trailer 325 is shown in an end perspective view in FIG. 3A. Electrical connections 302 for turbines and an auxiliary trailer are shown in recesses formed on a lateral surface of the trailer 325. A side opposite the lateral side of the trailer 325, as shown in the example 300-b according to an embodiment illustrated in FIG. 3B, can include electrical connections 302 for transformers.

Figure 3B:
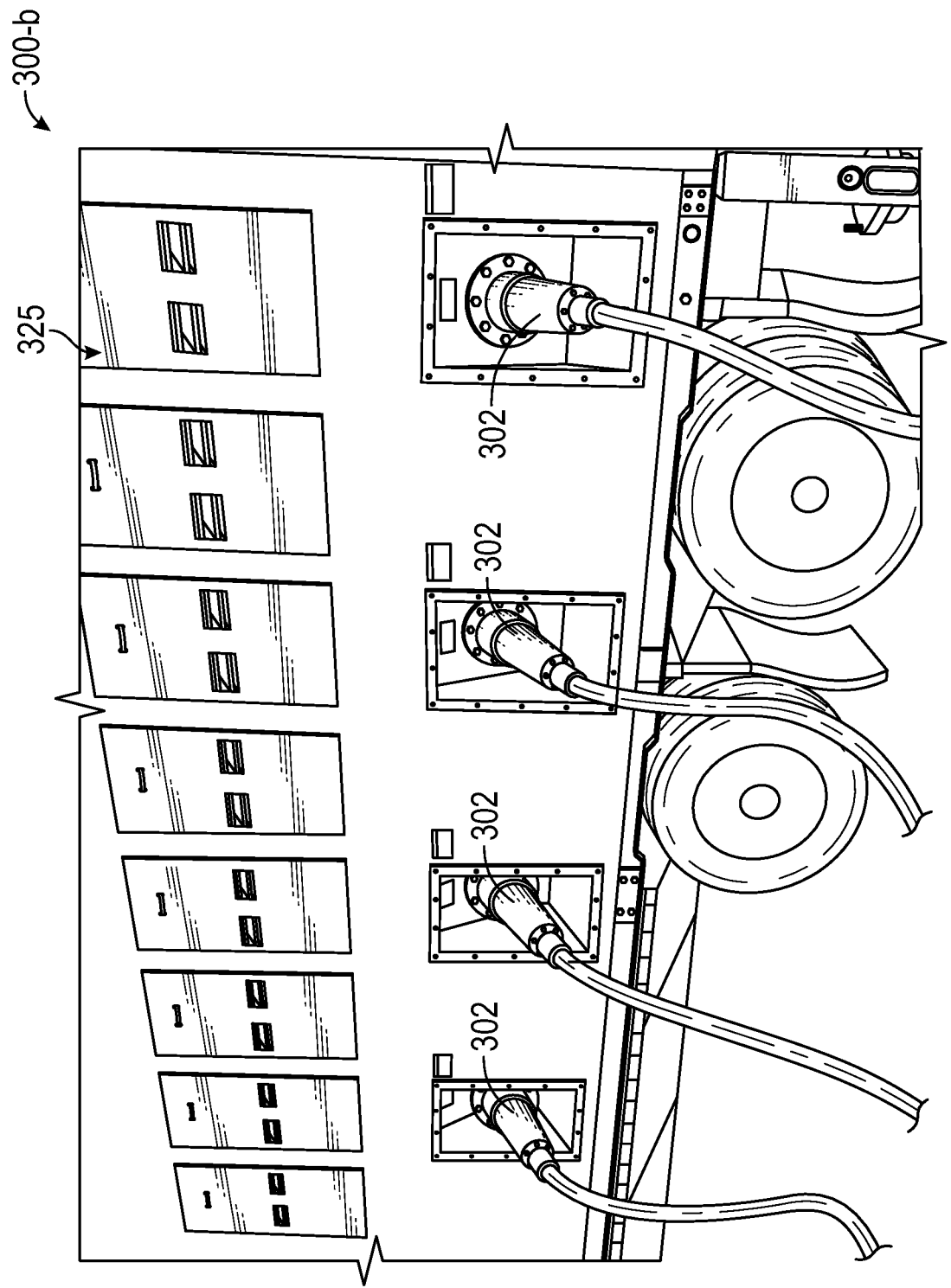

FIG. 3B illustrates in side perspective view a side of the switchgear trailer 325 opposite from that of shown in FIG. 3A. In the illustrated example, switchgear trailer 325 can be an example of a switchgear "B" trailer. Four connections 302 are visible, which are for the 13.8 kV cable that spans between the switchgear and the transformers. Each connection 302 is a cable that contains all three electrical phases, a ground, and a ground check; which is different from the cabling configuration of FIG. 4, which relies on the use of multiple conductors per phase, as discussed below.

The switchgear trailer 325 can house large breakers and fault protection equipment required for safe operations and for "lock-out, tag-out" of power going to selected equipment. The switchgear is optionally rated for 15 kV (13.8 kV), and can be designed or reconfigured for different voltages, such as 138 kV, 4,160 V, or 600 V, or any other voltage suitable for fracturing fleet operations. The switchgear can include ground fault detection, color coordinated cable receptacles, interlock system, and other safety features.

Figure 4:
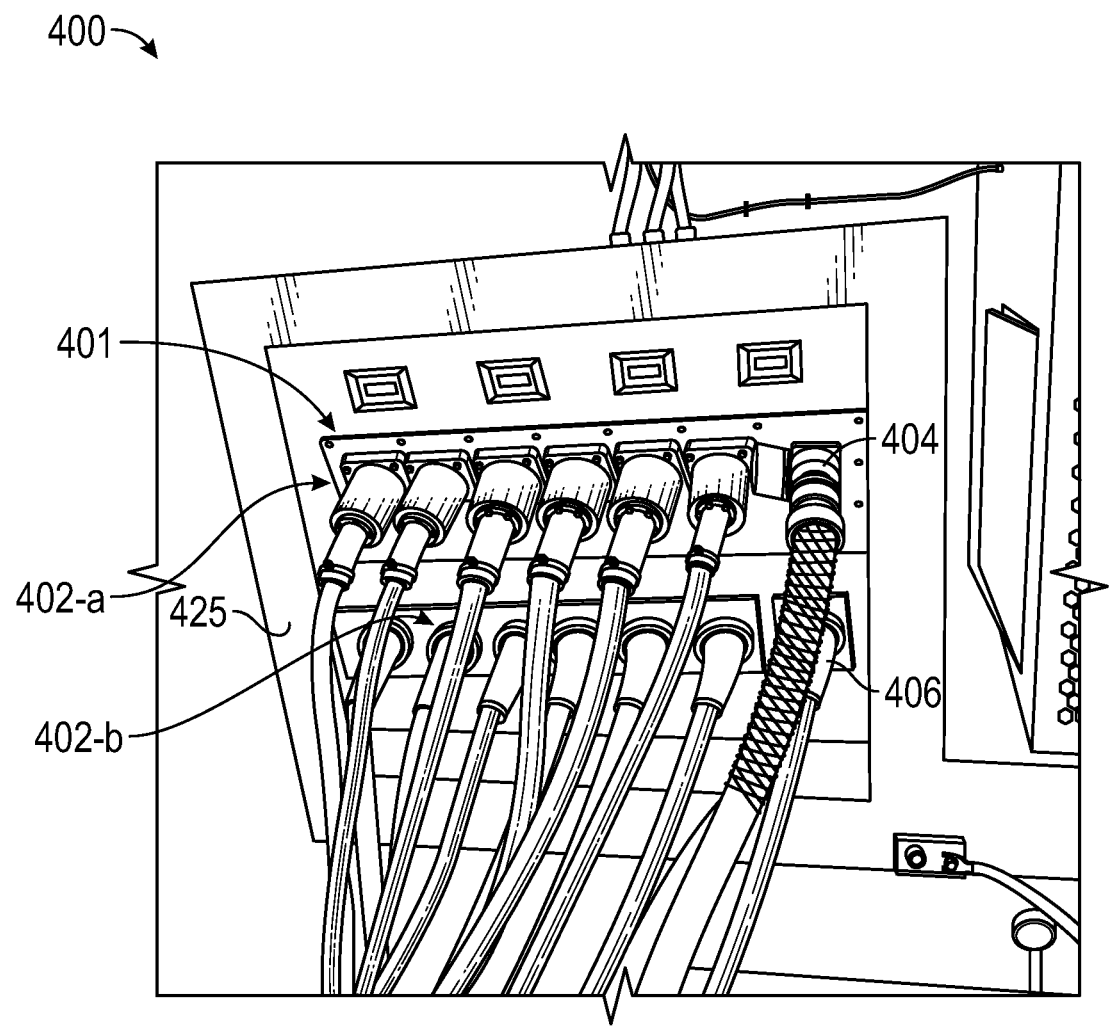
FIG. 4 is a perspective view of cables connecting to a hydraulic fracturing pump trailer according to an embodiment of the disclosure.

Illustrated in a side perspective view in FIG. 4 is an example 400 of multiple single-conductor cables connecting to a fracturing pump trailer 425, according to an embodiment. In the illustrated example, a 600 V power connection panel 401 contains power connections for two fracturing pumps. Each electrical phase is split into two separate cables. An upper row of plugs 402-a can be used to power one fracturing pump, while a lower row of plugs 402-b can be used to power a second fracturing pump on the same fracturing pump trailer 425.

In the illustrated example, the upper row of plugs 402-a includes six single-phase cable connections, and the lower row of plugs 402-b includes six single-phase cable connections, allowing for two cables per phase. The plugs can be color-coded based on the electrical phase. The power connection panel 401 can also include a control power cable 404 and a system ground cable 406. The system ground cable 406 can act as a ground between the fracturing pump trailer 425 and a 13.8 kV to 600 V transformer (not shown) providing power to the fracturing pump trailer 425. Additional cables can span between the 13.8 kV to 600 V transformer and the fracturing pump trailer 425.

Figure 5:
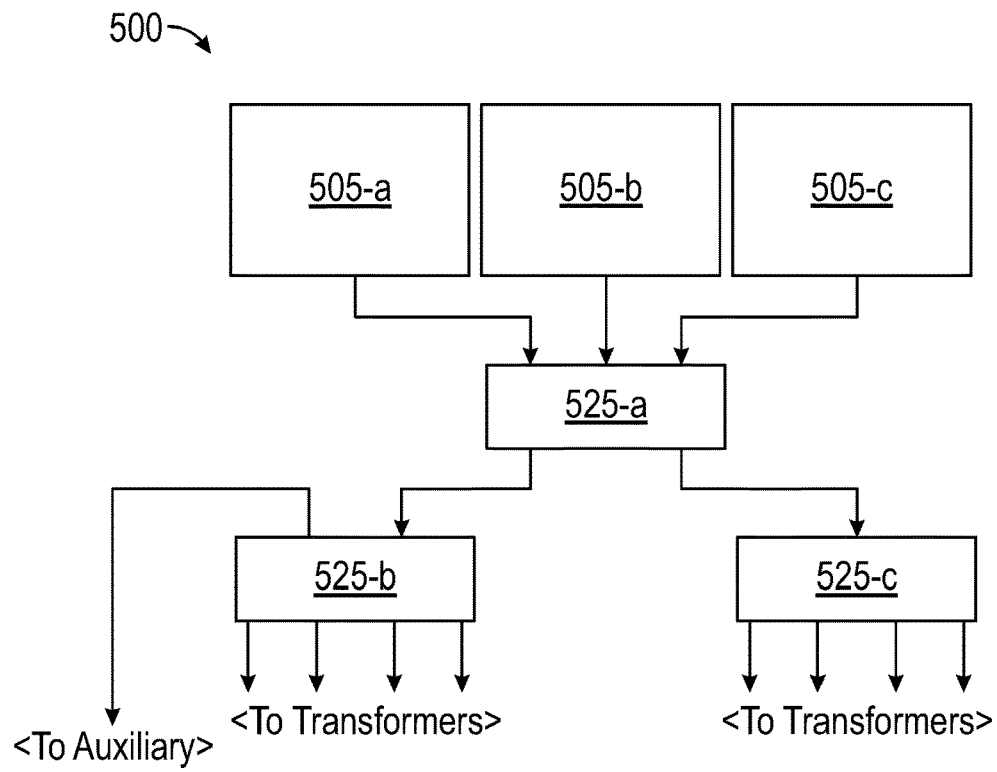
FIGS. 5-15 are block diagrams of portions of a microgrid having a plurality of turbine generator sets and switchgear units according to various embodiments.

FIG. 5 is a block diagram illustrating one example 500 of a plurality of generator sets 505-a, 505-b, 505-c for use with a system for fracturing a subterranean formation. Each generator set 505-a, 505-b, 505-c can include a turbine engine with sufficient mechanical power to rotate an electric generator with sufficient electrical power to provide electricity to a small, closed circuit, electrical grid. This grid can be considered part of the microgrid.

For the sake of discussion herein, certain types of switchgear units have nomenclature based on their application; for example a switchgear "A" can distribute power to other switchgear units, a switchgear "B" can transmit power to transformers and auxiliaries, and a switchgear "C" can transmit power to transformers. However, a switchgear trailer is not limited to the previously stated configurations. It is possible to power more than four transformers from a switchgear "B" or switchgear "C"; and a switchgear "B" can supply more than one auxiliary trailer if needed. Similarly, a switchgear "A" is not limited to connections for only three or four generator sets and only two switchgear trailers. The denotation of A, B, C, A+, B+ and C+ switchgear units does not reflect industry standards, but is a naming convention for use herein.

In the illustrated embodiment, switchgear "A" 525-a is an electrical hub combining the power output of three 5.7 MW natural gas turbine generators from generator sets 505-a, 505-b, 505-c. Further in this example, switchgear "A" 525-a can supply electrical power to two other switchgear units. Switchgear "B" 525-b can receive power from switchgear "A" 525-a and distribute the power to an auxiliary unit and multiple transformers, as shown. Switchgear "C" 525-c can also receive power from switchgear "A" 525-a and distribute the power to one or more transformers, but in the illustrated embodiment does not distribute power to an auxiliary unit.

In this example, the illustrated lines leading between the generator sets 505-a, 505-b, 505-c, switchgear units 525-a, 525-b, 525-c, and auxiliary units and transformers can be 13,800 volt, three-phase, 60 Hz, power lines. This example allows load distribution between all three turbines in generator sets 505-a, 505-b, 505-c through switchgear "A" 525-a. Optionally, the power demand placed on each generator set 505-a, 505-b, 505-c can be equal, and each generator set 505-a, 505-b, 505-c can run at an equal output.

Figure 6:
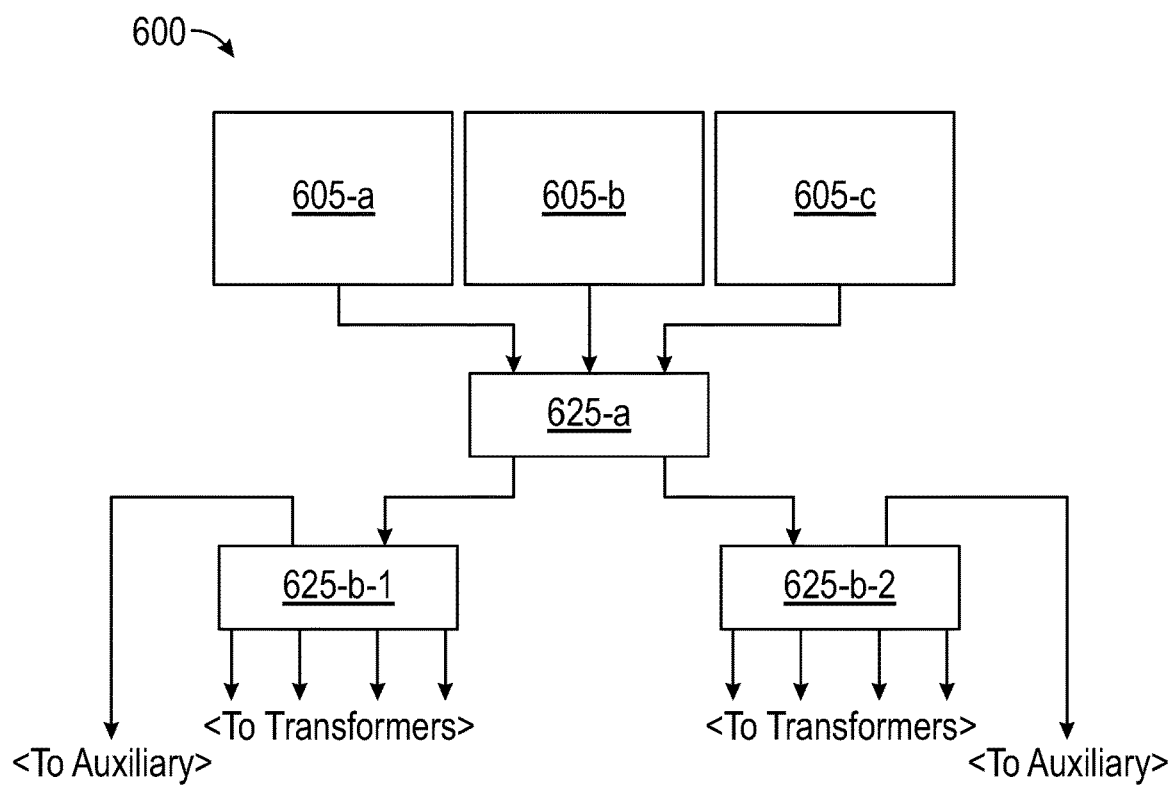

FIG. 6 is a block diagram showing an embodiment 600 illustrating a plurality of generator sets 605-a, 605-b, 605-c for use with a system for fracturing a subterranean formation. Similarly to the example 500 illustrated in FIG. 5, switchgear "A" 625-a is an electrical hub combining the power output of three 5.7 MW natural gas turbine generators from generator sets 605-a, 605-b, 605-c, where switchgear "A" 625-a can supply electrical power to two other switchgear "B" units 625-b-1, 625-b-2. While described as being a 5.7 MW generator, other generator configurations capable of operating at other power outputs are also envisioned. For example, in an embodiment, a 6.5 MW turbine generator can be used.

In contrast to the example provided in FIG. 5, in this example switchgear "C" 525-c is replaced with a second switchgear "B" 625-b-2. Both switchgear "B" units 625-b-1, 625-b-2 couple to and provide power for a secondary auxiliary, which can include any one or more of a secondary blender, electric wireline, water transfer, crane, a second data van, turbine inlet chillers, and the like.

Figure 7:
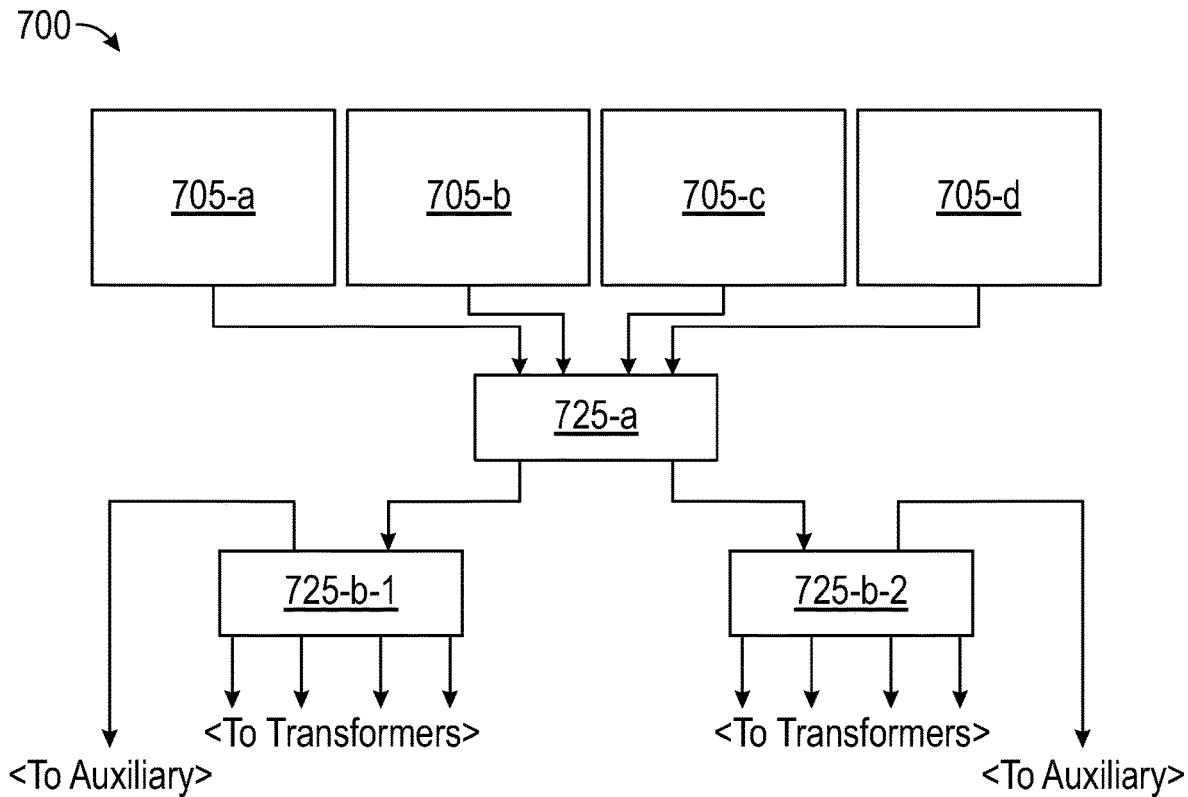

FIG. 7 is a block diagram of another example 700 of a switchgear layout for use with a fracturing system, according to an embodiment. In this example, switchgear "A" 625-*a* of FIG. 6 is substituted with switchgear "A+" 725-*a*, allowing for connections and breakers for a fourth generator set 705-*d*. This configuration allows for powering more equipment for a wider range of applications. Switchgear "A+" 725-*a* can supply electrical power to two other switchgear "B" units 725-*b*-1, 725-*b*-2. In an alternate embodiment, one or more of switchgear "B" units 725-*b*-1, 725-*b*-2 can be replaced with a switchgear "B+" unit. This embodiment provides advantages with regard to cost, as existing switchgear trailers can be upgraded or modified accordingly without the need for purchasing new trailers.

Figure 8:
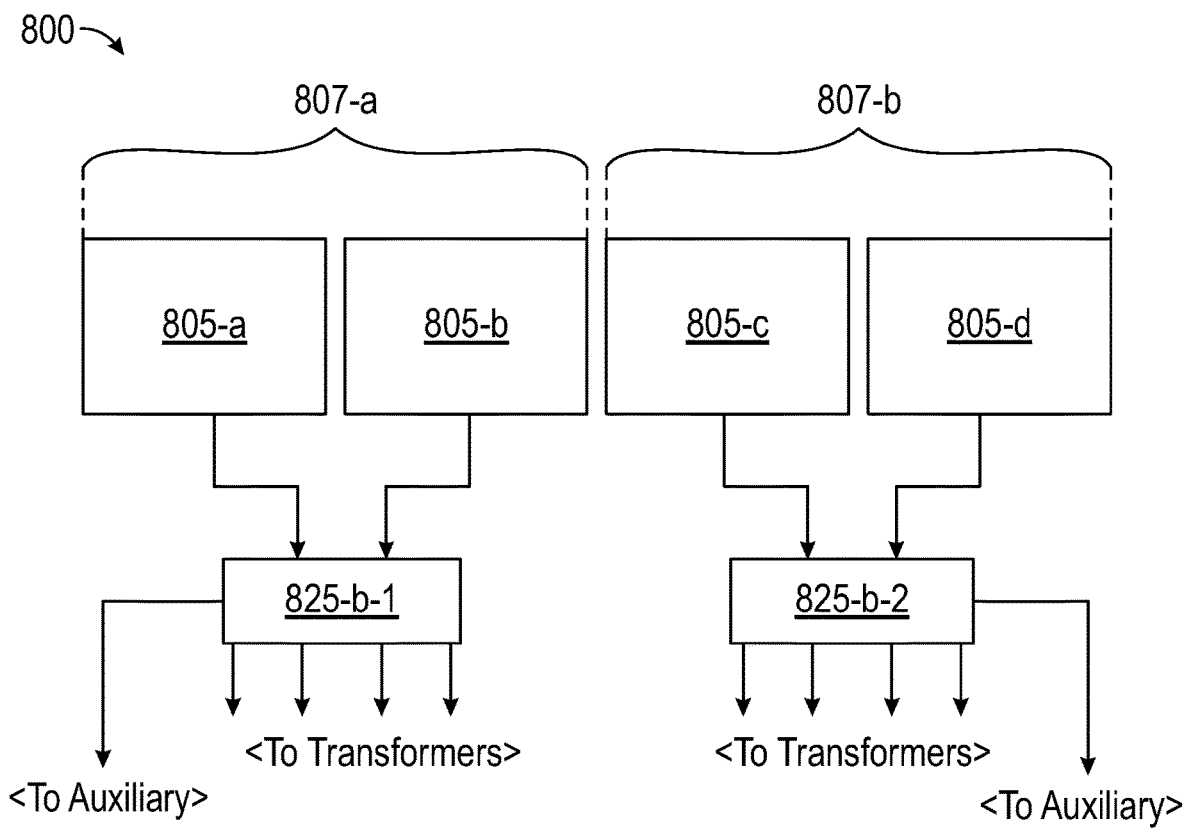

FIG. 8 is a block diagram illustrating an alternate example 800 of a plurality of generator sets for use with a system for fracturing a subterranean formation, according to an embodiment. In the illustrated example, the power transmission network is broken into two banks with direct communication between generator sets 805-*a*, 805-*b* and switchgear "B" 825-*b*-1 in the first bank 807-*a*, and generator sets 805-*c*, 805-*d* and switchgear "B" 825-*b*-2 in the second bank 807-*b*. Generator sets 805-*a*, 805-*b* can be load sharing through one switchgear "B" 825-*b*-1, and generator sets 805-*c*, 805-*d* can be load sharing through another switchgear "B" 825-*b*-2. Direct communication between generator sets 805-*a*, 805-*b*, 805-*c*, 805-*d* and switchgear "B" 825-*b*-1, 825-*b*-2 can require fewer switchgear trailers, which can save space, decrease equipment costs, and decrease the amount of cables being run, while allowing addition of a fourth generator set 805-*d*.

Splitting the microgrid into two banks 807-*a*, 807-*b* can build redundancy into the system. If a single generator set fails during peak power demand, any other generator set on the same circuit can share the load. If the load is too high, the other turbines will shut down, causing a complete blackout; in hydraulic fracturing, this can result in a "screen out." During a "screen out," the fluid in the wellbore is full of sand when the pumps stop, causing the sand to drop out of suspension in the fluid and plug off the well, which is expensive and time consuming to clean out. With two separate electrical banks, a failure in one bank (due to a ground fault, mechanical breakdown, software issue, fuel problem, cable issue, breaker failure, etc.) will not cause a failure in the other bank. The load on the opposite pair of turbines will remain the same, resulting in only a blackout for half of the equipment; operators can flush the well bore with half of the equipment in most situations. Two switchgear units "B" can be used to allow either bank to provide power to a blender, which allows the hydraulic fracturing equipment that is connected to either power bank to be self-sufficient and capable of flushing the well bore in event of a generator failure.

In the example of FIG. 8, if all four turbines 805-*a*, 805-*b*, 805-*c*, 805-*d* were operating at 50% while configured in pairs on two separate power banks 807-*a*, 807-*b*, shutting one turbine down in a given load bank will result in the other turbine in that pair having to pick up the entire power demand for the bank (circuit). This will result in 100% load on a single turbine, and could likely shut down the operating turbine, causing a blackout for half of the equipment. In the summer months when temperatures are elevated, turbine engines cannot reach their maximum potential as power output is derated due to the hot ambient air being less dense. Thus all four turbines may be required to operate despite their load percentage being as low as 35% in certain cases.

Figure 9:
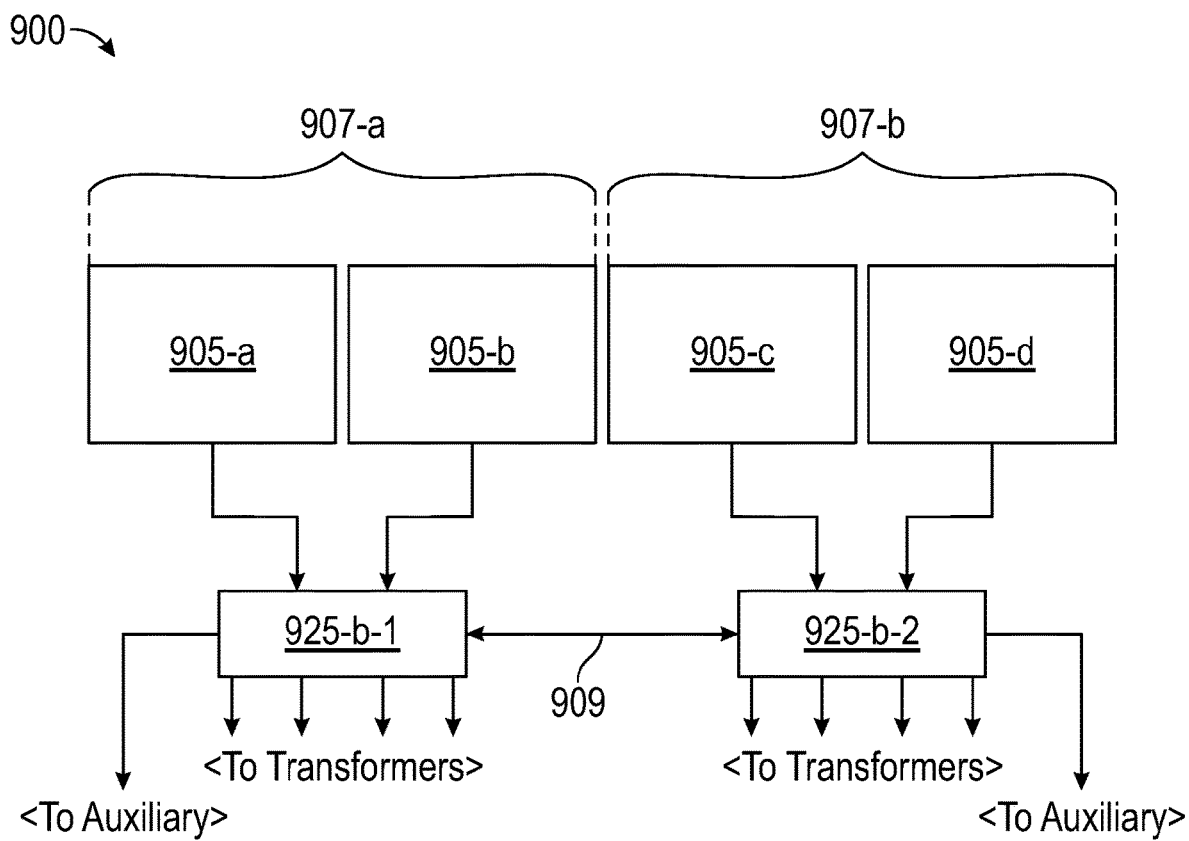

Another alternate example 900 of a plurality of generator sets for use with a system for fracturing a subterranean formation is schematically illustrated in FIG. 9. Similarly to the example 800 illustrated in FIG. 8, generator sets 905-*a*, 905-*b* and switchgear "B+" 925-*b*-1 can make up a first bank 907-*a*, and generator sets 905-*c*, 905-*d* and switchgear "B+" 925-*b*-2 can make up a second bank 907-*b*. Differently from example 800, however, in the illustrated example 900, the switchgear units 925-*b*-1, 925-*b*-2 are able to load share with one another.

Example cables are shown spanning between the two "B+" switchgear units 925-*b*-1, 925-*b*-2, which optionally are 13.8 kV cables for a tie breaker 909. Tie breaker 909 can allow for complete load sharing between all four turbines in generator sets 905-*a*, 905-*b*, 905-*c*, 905-*d* without the need for a switchgear "A," as illustrated in FIG. 5. A bus tie breaker 909 between switchgear "B+" 925-*b*-1 and switchgear "B+" 925-*b*-2 can be used when combining the power output from difference sources, such as in the case of using multiple generator sets 905-*a*, 905-*b*, 905-*c*, 905-*d*.

In one example of operation of the system of FIG. 9, all four turbines 905-*a*, 905-*b*, 905-*c*, 905-*d* can continue to operate even at loads below 50%, which can increase fuel consumption and wear on the turbines. For example, if four load sharing turbines were operating at a 50% load, one turbine could be shut down, allowing the other turbines to distribute the power demand, resulting in three turbines running at approximately 67% load. Turbines typically operate more efficiently at higher loads and the turbine generators enter the lean dry fuel ratio mode at above 50% load, allowing them to operate at higher efficiency with lower emissions than normal.

In one example procedure for starting the turbine generators, all breakers (not shown) in each switchgear and EER can be set to an open position such that no electricity passes across the breakers, and generator set 905-*b* can be started from a black start generator (not shown). Once generator set 905-*b* is running and operating steadily, generator set 905-*b* can be connected to the bus on switchgear "B+" 925-*b*-1 by closing the breakers in each switchgear and EER.

In the described embodiment, generator set 905-*a* can be started through the power supplied from switchgear "B+" 925-*b*-1, which can in turn be powered by generator set 905-*b*. This configuration is commonly known as back-feeding, a process that ensures that the generators are in sync with each other. Operating out of sync, operating with three electrical phases not having identical phase angles, or operating when any two phases are reversed, can each cause catastrophic damage to the system.

Phase synchronization can be controlled by the EER, and may not allow current to flow onto a common power bus between two electrical sources (by keeping breakers open in the EER) until synchronization is complete. A tie breaker can also be used to synchronize the electrical phases so that two separate generator sources can be put on a bus together to provide power to equipment. In some cases, the electrical sources can be the two isolated switchgear units 925-*b*-1, 925-*b*-2.

A tie breaker can be installed in each switchgear "B+" 925-*b*-1, 925-*b*-2 to allow generator sets 905-*a*, 905-*b*, 905-*c*, 905-*d* to be synchronized and placed on a single bus together. Thus the two switchgear units "B+" 925-*b*-1, 925-*b*-2 can act as a single switchgear to provide load sharing, power transmission, and breaker protection to all four generator sets 905-*a*, 905-*b*, 905-*c*, 905-*d*.

If load sharing is desired, the tie breaker can be used to close the joining breaker 909 between the switchgear "B+"

925-*b*-1, 925-*b*-2 trailers, which can allow for electrical current to flow in either direction to balance the load. If having two separate electrical banks 907-*a*, 907-*b* is desired, the joining breaker 909 can be kept open, separating the switchgear units "B+" 925-*b*-1, 925-*b*-2 from each other electrically.

This switchgear model example 900 can provide an option to have modular generator sets 905-*a*, 905-*b*, 905-*c*, 905-*d*. If only two or three generator sets are required, for example due to ambient temperatures or customer requirements, one or more generator sets can be shut down (or not rigged in). In the described configuration, even with one or more generator sets shut down, the system can nevertheless balance the load properly to supply power to the equipment, and to run the remaining turbines at a higher load and efficiency. During startup, the turbine generators can be started by back-feeding from the common bus 909 of the switchgear units "B+" 925-*b*-1, 925-*b*-2, as long as one turbine generator is started from the black start generator (not shown).

Figure 10:
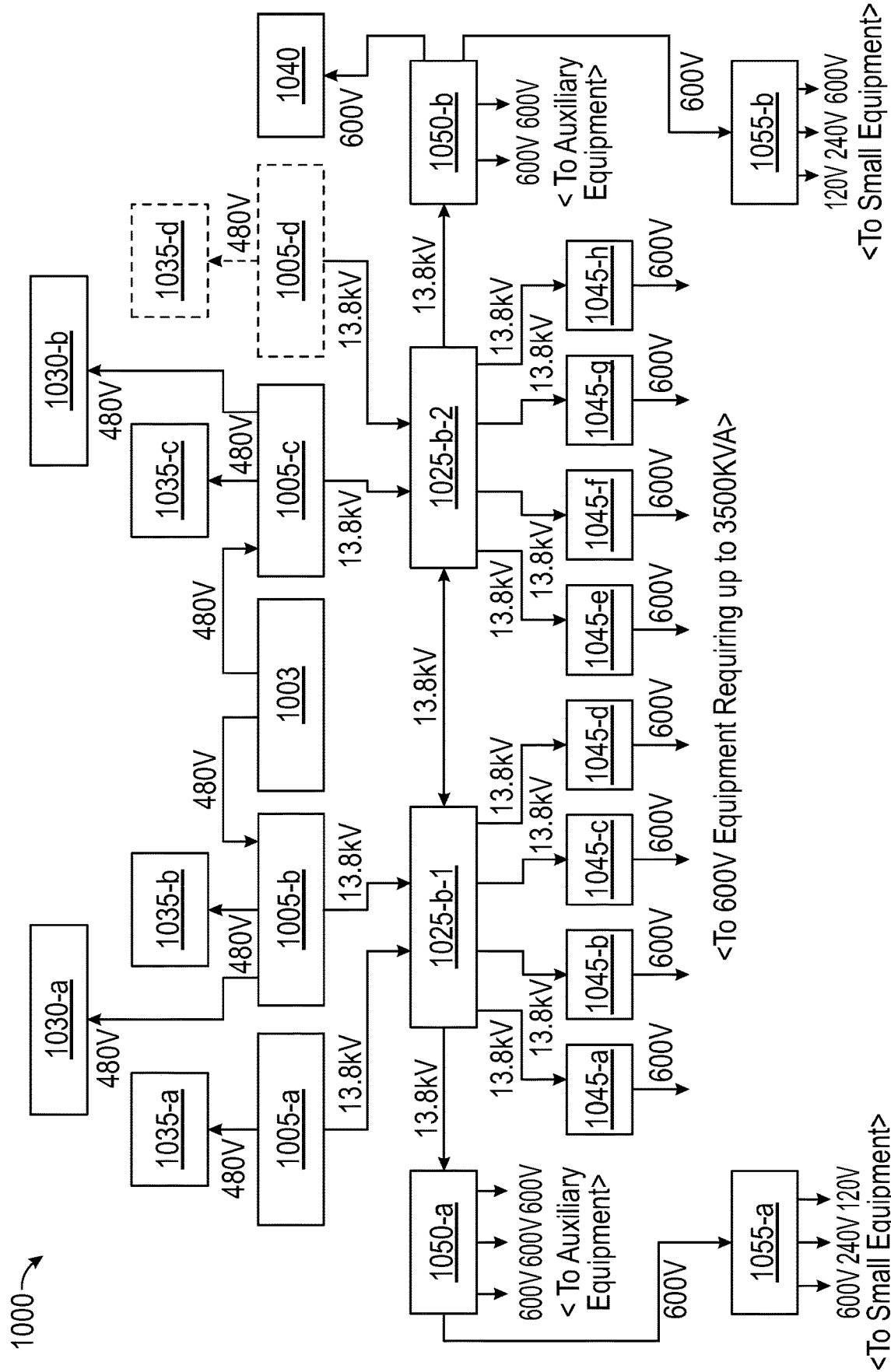

FIG. 10 is a block diagram illustrating an example 1000 of a portion of a power flow diagram of a microgrid for use with a wellbore fracturing system, which includes electrical connections for 480 V, 600 V, and 13.8 kV, according to an embodiment. Shown are gas compressors 1030-*a*, 1030-*b*, which can be powered by electricity in some examples, but can optionally be powered by combusting fuel, such as natural gas, diesel, and the like, in other examples. Fuel gas filtration and heating units 1035-*a*, 1035-*b*, 1035-*c*, 1035-*d* are also depicted.

A black start generator 1003 is shown in electrical communication with generator sets 1005-*b*, 1005-*c*, and can be used to start the turbine generators. In an alternative embodiment, black start generator 1003 can be connected to each generator set 1005-*a*, 1005-*b*, 1005-*c*, 1005-*d*, or to a single turbine. The black start generator 1003 can initially provide power to equipment operating at 480 V, which can then be handed off to a small 480 V transformer (not shown) located on each generator set 1005-*a*, 1005-*b*, 1005-*c*, 1005-*d*, once the generator sets 1005-*a*, 1005-*b*, 1005-*c*, 1005-*d* are operational.

Also shown are 480 V, three-phase, 60 Hz power lines between the compressors 1030-*a*, 1030-*b*, generator sets 1005-*a*, 1005-*b*, 1005-*c*, 1005-*d*, and fuel gas filtration and heating units 1035-*a*, 1035-*b*, 1035-*c*, 1035-*d*. The power lines can depict the normal flow path of electrical current between the components of the microgrid. A chiller unit 1040 is shown, which can be an option for boosting the output of the turbine generators of generator sets 1005-*a*, 1005-*b*, 1005-*c*, 1005-*d* to negate the need for a fourth turbine. However, a fourth turbine may be required in some embodiments, or can be used in lieu of an air inlet chiller unit in some embodiments.

Also depicted in the illustrated embodiment is power transmission equipment, which can include switchgear "B+" units 1025-*b*-1, 1025-*b*-2, and 13.8 kV, three-phase, 60 Hz power cables. The switchgear "B+" units 1025-*b*-1, 1025-*b*-2 can provide power to the 3,500 kVA, 13.8 kV to 600 V step-down transformers 1045-*a*, 1045-*b*, 1045-*c*, 1045-*d*, 1045-*e*, 1045-*f*, 1045-*g*, 1045-*h* and auxiliary units 1050-*a*, 1050-*b*. The auxiliary units 1050-*a*, 1050-*b* can contain a large 13.8 kV to 600 V transformer, and can perform motor control, switching, and further distribution of power to auxiliary equipment and smaller loads. Power cables operating at 600 V, three-phase, 60 Hz are depicted according to a normal current flow path.

The mini-substations 1055-*a*, 1055-*b* shown can also be part of the distribution network, receiving power supplied by an auxiliary trailer, and having 120 V and 240 V, single-phase, 60 Hz plugs for power plant lights, heaters, or data vans. Mini-substations 1055-*a*, 1055-*b* can also contain 600 V, three-phase, 60 Hz connections as an extra hub to provide power to any extra equipment. Extra equipment can include, for example, water transfer pumps, wireline equipment, electric cranes, work trailers, living quarters, emergency showers, sand equipment, or future additions to the fleet.

The orientations and positions of the equipment in example 900 are for graphical purposes only to illustrate the flow of electricity and interconnections. On a well site, the equipment may be placed in any order or configuration geographically, as long as the electrical schematic does not change.

The example methods of using two "B+" switchgear units to provide power transmission and load sharing advantageously allows for load sharing, while still having the advantage of fewer cables and less equipment. The method of using two "B+" switchgear units enables operation of two separate grids for redundancy or a single load sharing grid for efficiency.

Figure 11:
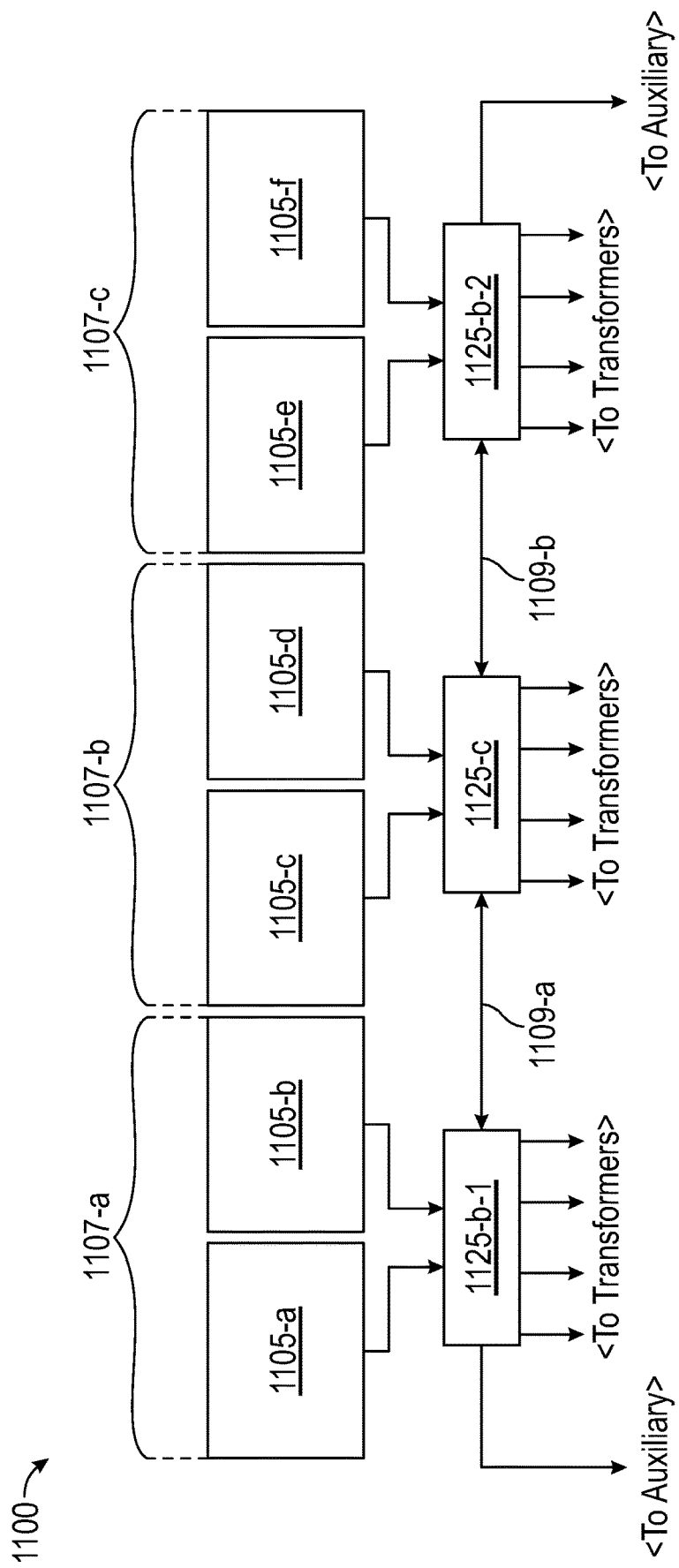

Illustrated in FIG. 11 is a block diagram showing an example 1100 of switchgear load sharing for multiple generator sets 1105-*a*, 1105-*b*, 1105-*c*, 1105-*d*, 1105-*e*, 1105-*f*, according to an embodiment. Here a switchgear "C+" 1125-*c* is depicted having tie breakers 1109-*a*, 1109-*b* for load sharing without provisions for an auxiliary trailer. In some examples, the switchgear "C+" 1125-*c* trailer and switchgear "B+" 1125-*b*-1, 1125-*b*-2 trailers can be interchanged with each other, as some applications may not require auxiliary trailers or their corresponding equipment.

Additionally, although three or four turbines are illustrated in many of the examples provided herein, this is not a limitation and alternate configurations having more or fewer turbines are envisioned to provide power for multiple fleets or well sites, including non-hydraulic fracturing applications.

Similarly to FIGS. 8 and 9, the power transmission network can be broken into multiple banks with direct communication between generator sets 1105-*a*, 1105-*b* and switchgear "B+" 1125-*b*-1 in the first bank 1107-*a*; generator sets 1105-*c*, 1105-*d* and switchgear "C+" 1125-*c* in the second bank 1107-*b*; and generator sets 1105-*e*, 1105-*f* and switchgear "B+" 1125-*b*-2 in the third bank 1107-*c*. Generator sets 1105-*a*, 1105-*b* can be load sharing through switchgear "B+" 1125-*b*-1, generator sets 1105-*c*, 1105-*d* can be load sharing through switchgear "C+" 1125-*c*, and generator sets 1105-*e*, 1105-*f* can be load sharing through another switchgear "B+" 1125-*b*-2. Additionally, as in FIG. 9, the switchgear units "B+" 1125-*b*-1, 1125-*b*-2 and switchgear "C+" 1125-*c* are able to load share with one another via tie breakers 1109-*a*, 1109-*b*.

Figure 12:
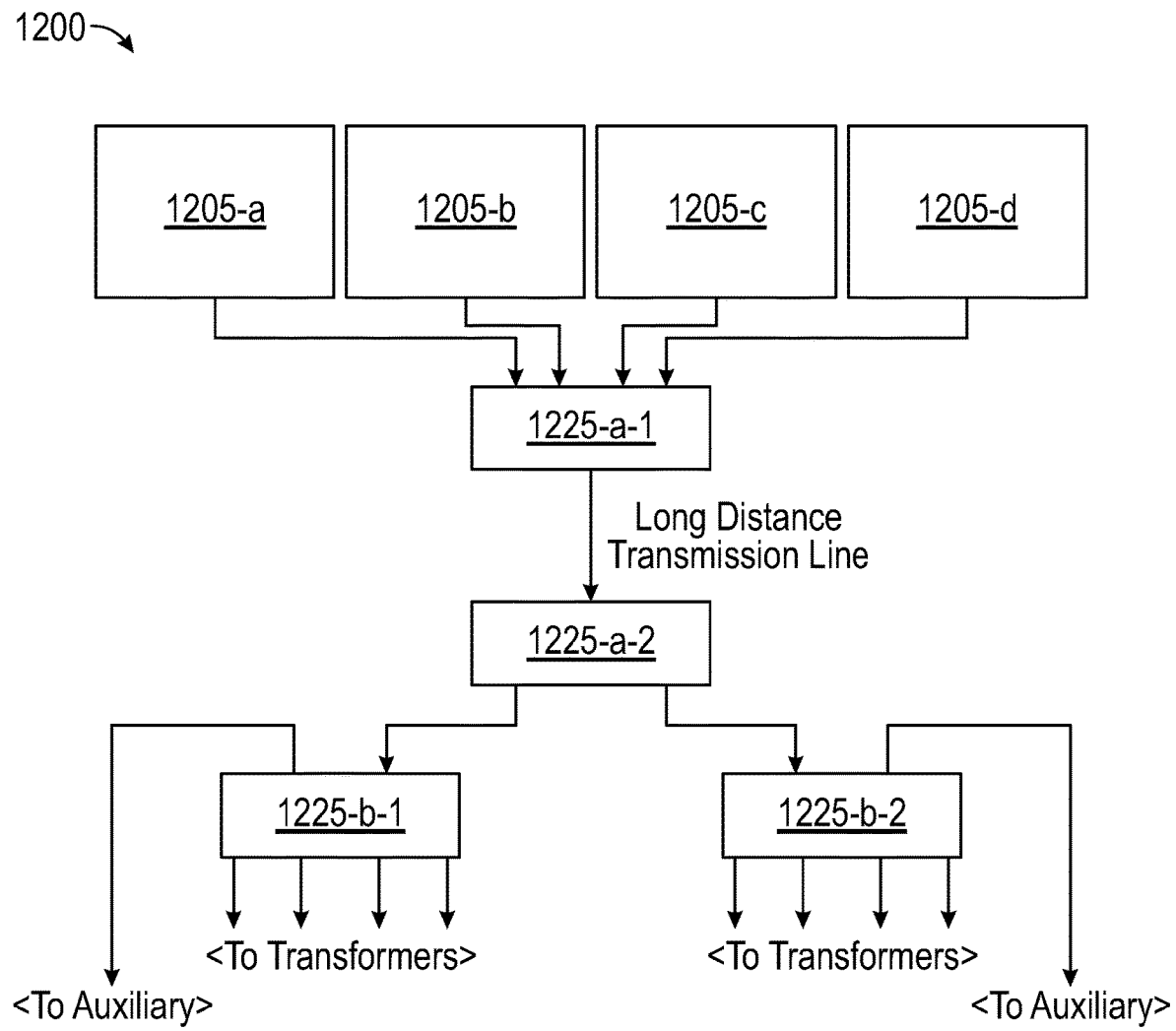

FIG. 12 is a block diagram depicting an example 1200 of a switchgear load sharing option for providing power to equipment which is on a different site than the power generation equipment, according to an embodiment. Although illustrated in example 1200 in one configuration, many other switchgear configurations can provide power to equipment located remotely from the power generation equipment.

As shown, a series of four generator sets 1205-*a*, 1205-*b*, 1205-*c*, 1205-*d* can provide power to switchgear "A" 1225-*a*-1 at a first location. Power received at switchgear "A" 1225-*a*-1 can be communicated to switchgear "A" 1225-*a*-2 at a second location. In the illustrated embodiment, load sharing is handled by switchgear units "A" 1225-*a*-1, 1225-*a*-2, such that a tie breaker between two switchgear "B" units 1225-*b*-1, 1225-*b*-2 may not be necessary. In one example, the long distance transmission line can be several miles long and can be in the form of overhead or buried power lines. Any distance up to approximately 30 miles is feasible; at further distances, step-up transformers may be used to prevent transmission losses from becoming prohibitive. This approximation can depend on the power generated, the power required, and the power conductors used.

Switchgear "A" 1225-*a*-2 can supply electrical power to two other switchgear units. Switchgear "B" 1225-*b*-1 can receive power from switchgear "A" 1225-*a*-2 and distribute the power to an auxiliary unit and one or more transformers as shown. Switchgear "B" 1225-*b*-2 can also receive power from switchgear "A" 1225-*a*-2 and can distribute the power to an auxiliary unit and one or more transformers.

Figure 13:
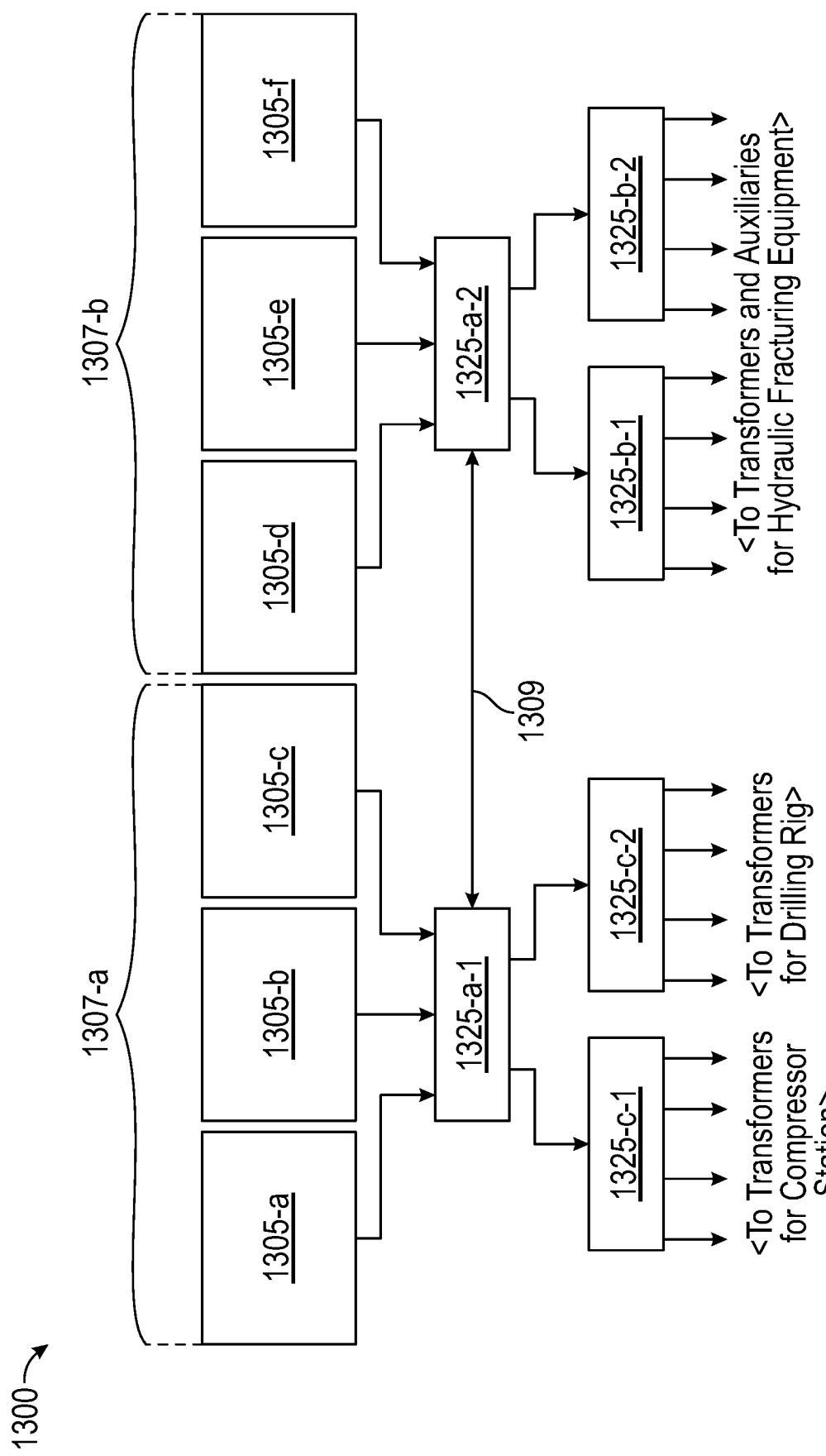

FIG. 13 is a block diagram illustrating an example 1300 of a system that, like the system of FIG. 12, is capable of powering and load sharing from multiple sites and processes, according to an embodiment. Generator sets 1305-*a*, 1305-*b*, 1305-*c* and switchgear "A+" 1325-*a*-1 can make up a first bank 1307-*a*, and generator sets 1305-*d*, 1305-*e*, 1305-*f* and switchgear "A+" 1325-*a*-2 can make up a second bank 1307-*b*. In the illustrated example 1300, switchgear units "A+" 1325-*a*-1, 1325-*a*-2 are able to load share with one another. The switchgear units in this configuration can provide load sharing through their internal electrical bus as well as through external power connections with tie breakers as previously described. Example cables are shown spanning between the two switchgear units "A+" 1325-*a*-1, 1325-*a*-2, which optionally are 13.8 kV cables for a tie breaker 1309. Tie breaker 1309 can allow for complete load sharing between all six turbines in generator sets 1305-*a*, 1305-*b*, 1305-*c*, 1305-*d*, 1305-*e*, 1305-*f*.

Each switchgear "C" 1325-*c*-1, 1325-*c*-2 can be used to power sites like drilling rigs, compressor stations, nitrogen plants, "man camps," pumping stations, a second fracturing site (e.g., for pump-down operations, injections tests, low rate jobs, or to power third party equipment), etc. The switchgear units "B" 1325-*b*-1, 1325-*b*-2 combined can power a single hydraulic fracturing fleet. As previously described, the lines from switchgear units "A+" 1325-*a*-1, 1325-*a*-2 to switchgear units "C" 1325-*c*-1, 1325-*c*-2 and switchgear units "B" 1325-*b*-1, 1325-*b*-2 can be representative of power transmission lines and can be as long as 30 miles in this configuration. The lines from switchgear units "C" 1325-*c*-1, 1325-*c*-2 and switchgear units "B" 1325-*b*-1, 1325-*b*-2 can be representative of diesel locomotive cables ("DLO") which, when laid out on the ground between the equipment, may span about one mile in distance. In other embodiments the distances can be about 25 feet to about 200 feet. Buried or suspended cables can also be used if desired or required.

Figure 14:
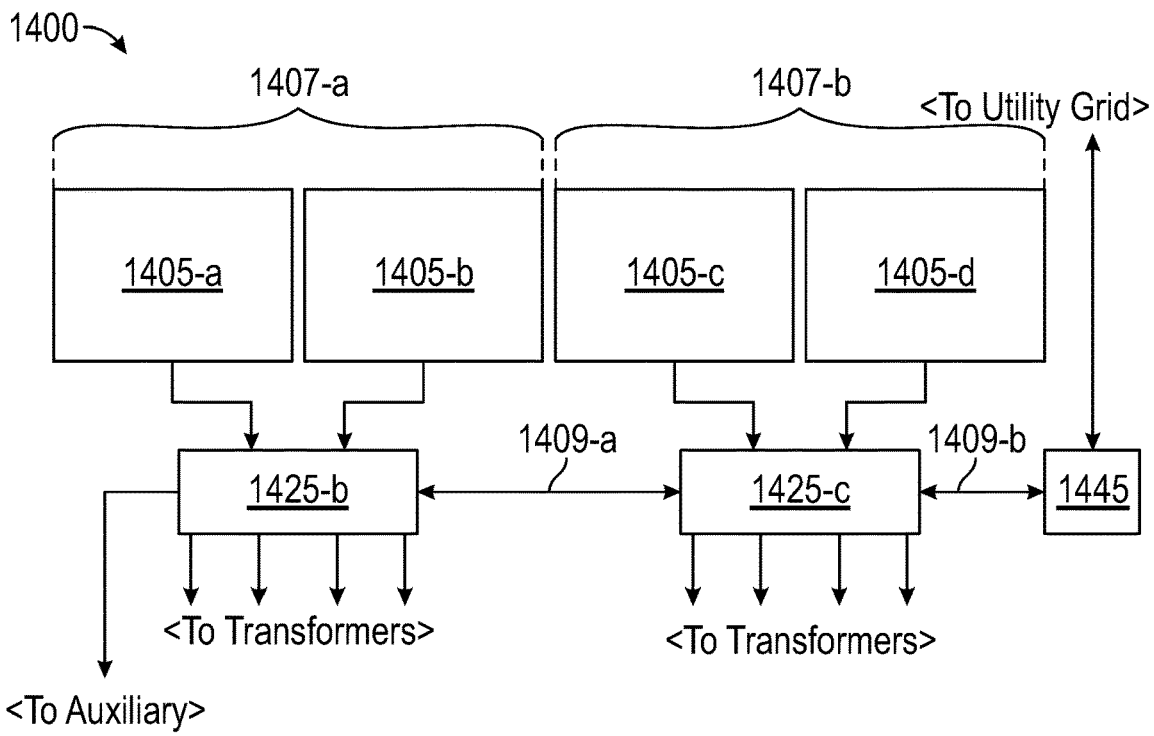

FIG. 14 illustrates an example 1400 of a configuration for load sharing with a utility grid, according to an embodiment. In the illustrated example, the power transmission network is broken into two banks with direct communication between generator sets 1405-*a*, 1405-*b* and switchgear "B+" 1425-*b* in the first bank 1407-*a*, and generator sets 1405-*c*, 1405-*d* and switchgear "C+" 1425-*c* in the second bank 1407-*b*. In alternate embodiments, generator sets 1405-*c*, 1405-*d* can optionally be excluded.

In an example of operation, the transformer 1445 can convert the grid voltage to the power generation voltage, and tie breakers 1409-*a*, 1409-*b* can enable the switchgear units "B+" 1425-*b* and "C+" 1425-*c* to load share between the generator sets 1405-*a*, 1405-*b*, 1405-*c*, 1405-*d* and the utility grid. For example, if the utility grid is transmitting power at 69 kV, the transformer 1445 can step down the 69 kV voltage to 13.8 kV for use by the microgrid. In this configuration, power can be either provided to the grid or supplemented from the utility grid during times of peak power demand.

Figure 15:
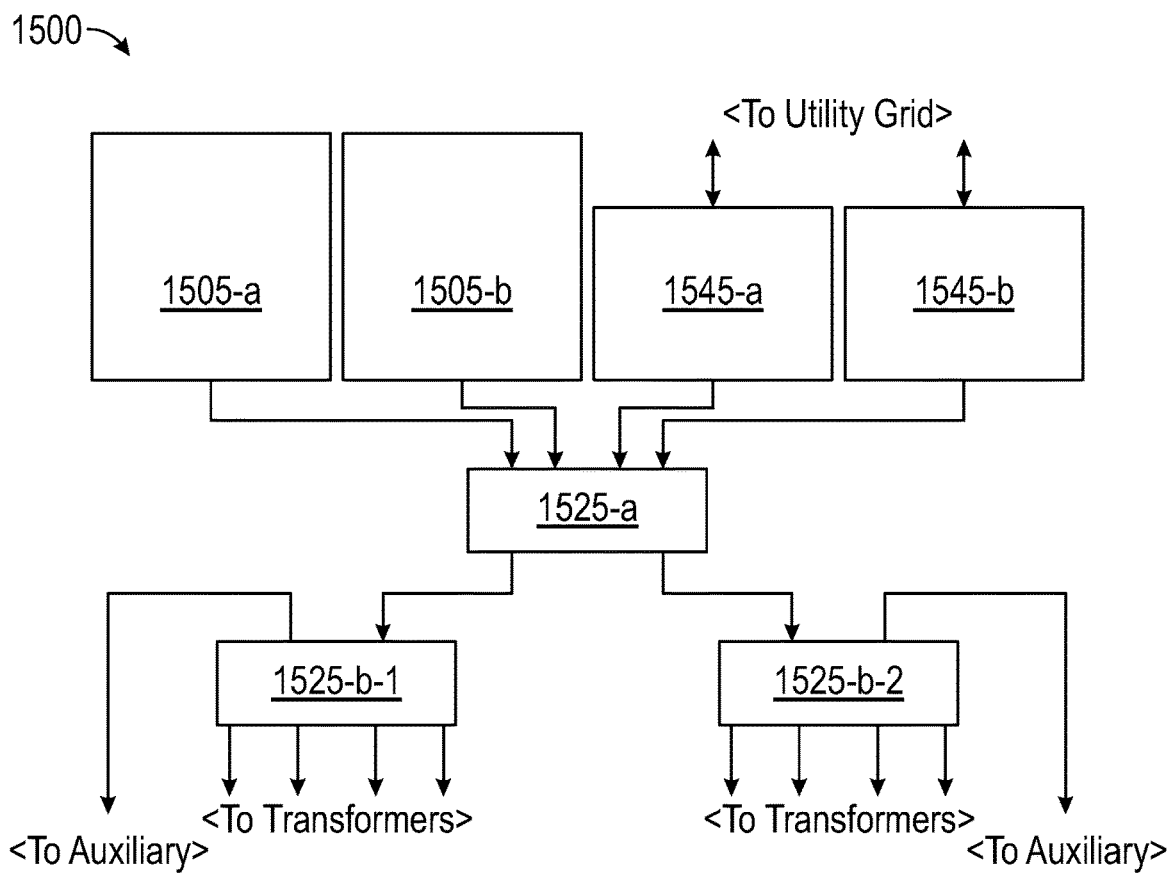

Depicted in FIG. 15 is another example 1500 for load sharing with a utility grid, according to an embodiment. Multiple transformers 1545-*a*, 1545-*b* are shown to depict the replacement of generator sets (e.g., generator sets 1405-*c*, 1405-*d* as illustrated in the embodiment shown in FIG. 14) with grid power. In the illustrated embodiment, multiple cables can be used to share the power load to allow for smaller cable sizes and transformers. In this embodiment, switchgear "A+" 1525-*a* can be used for load sharing, and tie breakers 1509-*a*, 1509-*b* can be located at each connection point with utility grid on switchgear "A+" 1525-*a*. Switchgear "A+" 1525-*a* can also supply electrical power to two other switchgear "B" units 1525-*b*-1, 1525-*b*-2.

In some embodiments, a small, diesel-fueled piston engine generator (not shown) can be used in lieu of an extra turbine generator for providing electrical power to transmission and distribution systems, which can add an extra megawatt of power if peak demand cannot be met with the existing turbine generators. An inability to meet peak demand could be due to hot weather, turbine de-rate, long transmission distance, or extra power demand from a user. These systems of switchgear load sharing by using either tie breakers or a hierarchy of switchgear units supplying power to each other can be used with any method of power generation. Power generation can be provided from turbine generators, piston engine generators, rotary engine generators, solar power cells, wind turbine power, utility grid power, or any other method of electricity generation. Switchgear trailers can be positioned on mobile trailers in some embodiments, or can be body-load or skid mounted units in other embodiments.

Examples of microgrid designs use 13.8 kV for transmission stepped down to 600 V for equipment, and in some cases 480 V for distribution to equipment. It is possible to use different voltages and to design or refit the switchgear trailers accordingly. The principles of power load sharing, transmission, and distribution can remain the same regardless of the generated voltage. Voltage levels such as 138 kV, 69 kV, 50 kV, 12 kV, 4,160 V, 1,380 V, 600 V, or 480 V can be used for transmission or power distribution. These voltages are based on a small sample of the many common methods used in the national power grids; technically, any voltage can be specified and used.

The type of power conductor used can be dependent on the current equipment requirements, customer requirements, and method of power transmission and distribution. In one embodiment, power transmission between generator sets and switchgear units employs a single large cable per connection, each cable containing conductors for all three power phases, ground, and ground check. Power distribution between transformers and fracturing equipment can include diesel locomotive (DLO) cable, which can lie on the ground between the equipment. Two cables can be used for each power phase, totaling six power cables (three-phase power, with two cables per phase). This practice allows cables to be smaller, lighter, and easier to manage. Also an equipment ground spanning between the transformers and equipment can be used, which in one example can bring the power cable requirement to seven single conductor DLO cables per fracturing pump. However, many possible cable configurations exist. In some embodiments a single cable per phase can be used, or three or more cables per phase can also be used. The method of using multiple single-conductor cables can also be used for 13.8 kV transmission between switchgear units.

It is also possible to use multi-conductor cables for 600 V power distribution; these cables can be similar to those used for 13.8 kV transmission, and can contain all three phases and a ground inside the cable. A single multi-conductor cable can be used in some embodiments, or several multi-conductor cables can be used to split the power load so that the cable can be lighter and smaller in other embodiments. These multi-conductor cables can have an internal ground and ground check in some embodiments, or the grounds can be external in other embodiments. These power cables can simply lie on the ground in between the equipment. The cables can also be suspended like power transmission lines, in which case non-insulated cables could be used. Alternatively the cables can also be buried underground to be out of sight and to avoid trip hazards.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A hydraulic fracturing system for fracturing a subterranean formation comprising:
   a plurality of electric pumps fluidly connected to a well associated with the subterranean formation and powered by at least one electric motor;
   two electrical banks, each of the two electrical banks comprising:
      a generator electrically coupled to the plurality of electric pumps, and
      a switchgear system electrically coupled to the generator and configured to distribute an electrical load between the plurality of electric pumps and the generator; and
   a tie breaker electrically coupled between respective switchgear systems of the two electrical banks, the tie breaker distributing the electrical load responsive to a position of the tie breaker, wherein the tie breaker is configured to:
      evenly distribute the electrical load between the plurality of electric pumps and the generators of the two electrical banks when the tie breaker is in a closed position; and
      isolate one or more of the plurality of electric pumps and at least one electrical bank of the two electric banks when the tie breaker is in an open position.

2. The hydraulic fracturing system of claim 1, wherein each of the two electrical banks is configured to distribute the electrical load between the plurality of electric pumps and the respective generators associated with the two electrical banks independent of an operating status of other electrical banks of the two electrical banks.

3. The hydraulic fracturing system of claim 1, further comprising:
   a single electrical microgrid including one generator of the two electrical banks, one switchgear system of the two electrical banks, and at least a portion of the plurality of electric pumps.

4. The hydraulic fracturing system of claim 1, wherein each electrical bank of the two electrical banks further comprises respective second generators, wherein:
   the tie breaker is in the closed position;
   both generators of one electrical bank of the two electrical banks are operational; and
   the second generator of the other electrical bank of the two electrical banks is shut down while the generator is active;
   wherein the electrical load is evenly distributed among the generators of the one electrical bank and the generator of the other electrical bank.

5. The hydraulic fracturing system of claim 1, further comprising:
   a third electrical bank comprising a generator and a switchgear system; and
   a second tie breaker electrically coupled between at least one switchgear system of the two electrical banks, the second tie breaker distributing the electrical load responsive to a position of the second tie breaker.

6. The hydraulic fracturing system of claim 1, wherein at least one of the switchgear systems is configured to distribute power among any of one or more transformers, auxiliaries, other switchgear systems, or a combination thereof.

7. The hydraulic fracturing system of claim 6, wherein the auxiliaries comprise one or more of any of a blender, electric wireline equipment, a water transfer pump, an electric crane, a data van, a work trailer, living quarters, an emergency shower, sand equipment, a turbine inlet chiller, a compressor station, a pumping station, a second fracturing site, a drill rig, or a nitrogen plant, or a combination thereof.

8. The hydraulic fracturing system of claim 1, further comprising:
   a transformer electrically coupled to a utility grid; and
   a second tie breaker electrically coupled between at least one switchgear system of the two electrical banks and the transformer.

9. The hydraulic fracturing system of claim 8, wherein the second tie breaker is positioned on a downstream side of the transformer such that the second tie breaker is not coupled to a connection from the utility grid absent the transformer.

10. The hydraulic fracturing system of claim 1, further comprising:
    an electrical connection between a utility grid and at least one of the switchgear systems.

11. The hydraulic fracturing system of claim 1, further comprising:
    a power connection panel associated with the plurality of electric pumps, wherein the power connection panel comprises:
       plurality of power connections for each of the plurality of electric pumps; and
       a system ground connection configured to act as a ground between the plurality of electric pumps and a transformer, wherein the transformer is configured to provide power to the plurality of electric pumps.

12. The hydraulic fracturing system of claim 1, further comprising:
    a variable frequency drive connected to the at least one electric motor to control the speed of the at least one electric motor, wherein the variable frequency drive is adapted to perform electric motor diagnostics.

13. A hydraulic fracturing system for fracturing a subterranean formation comprising:
- a plurality of electric pumps fluidly connected to a well associated with the subterranean formation and powered by at least one electric motor;
- three electrical banks, each of the three electrical banks comprising:
  - a generator electrically coupled to the plurality of electric pumps, and
  - a switchgear system electrically coupled to the generator and configured to distribute an electrical load between the plurality of electric pumps and the generator; and
- a first tie breaker electrically coupled between a first switchgear system and a second switchgear system of the three electrical banks, the first tie breaker distributing the electrical load responsive to a position of the first tie breaker; and
- a second tie breaker electrically coupled between a third switchgear system and the second switchgear system of the three electrical banks, the second tie breaker distributing the electrical load responsive to a position of the second tie breaker.

14. The hydraulic fracturing system of claim 13, wherein each of the three electrical banks is configured to distribute the electrical load between the plurality of electric pumps and the respective generators associated with the three electrical banks independent of an operating status of other electrical banks of the three electrical banks.

15. The hydraulic fracturing system of claim 13, wherein the first tie breaker is configured to:
- evenly distribute the electrical load between the plurality of electric pumps and respective generators of two electrical banks of the three electrical banks when the first tie breaker is in a closed position; and
- isolate one or more of the plurality of electric pumps and at least one electrical bank of the three electrical banks when the first tie breaker is in an open position.

16. A hydraulic fracturing system for fracturing a subterranean formation comprising:
- a plurality of electric pumps fluidly connected to a well associated with the subterranean formation and powered by at least one electric motor;
- a first electrical bank, comprising:
  - a first generator electrically coupled to a first portion of the plurality of electric pumps, and
  - a first switchgear system electrically coupled to the first generator and configured to distribute an electrical load between the first portion of the plurality of electric pumps and the first generator; and
- a second electrical bank, comprising:
  - a second generator electrically coupled to a second portion of the plurality of electric pumps, and
  - a second switchgear system electrically coupled to the second generator and configured to distribute the electrical load between the second portion of the plurality of electric pumps and the second generator; and
- a tie breaker electrically coupled between the first switchgear system and the second switchgear system, the tie breaker distributing the electrical load responsive to a position of the tie breaker, wherein the tie breaker is configured to:
  - evenly distribute the electrical load between the first portion and the second portion of the plurality of electric pumps, the first generator, and the second generator when the tie breaker is in a closed position; and
  - isolate the second portion of the plurality of electric pumps, the second generator, and the second switchgear system when the tie breaker is in an open position.

17. The hydraulic fracturing system of claim 16, further comprising:
- a third generator of the first electrical bank; and
- a fourth generator of the second electrical bank;
- wherein the electrical load, when the tie breaker is in the closed position, is evenly distributed between the first electrical bank and the second electrical bank, the first electrical bank having both the first generator and the third generator in an operational state and the second electrical bank having the second generator in an operational state and the fourth generator in a non-operational state.

18. The hydraulic fracturing system of claim 16, further comprising:
- a third electrical bank comprising a third generator and a third switchgear system; and
- a second tie breaker electrically coupled between the second switchgear system and the third switchgear system, the second tie breaker distributing the electrical load responsive to a position of the second tie breaker.

19. The hydraulic fracturing system of claim 16, wherein at least one of the first switchgear system or the second switchgear system is configured to distribute power among any of one or more transformers, auxiliaries, or other switchgear system units, or a combination thereof.

20. The hydraulic fracturing system of claim 16, further comprising:
- a transformer electrically coupled to a utility grid; and
- a second tie breaker electrically coupled between the second switchgear system and the transformer.

* * * * *